W. C. HARROLD.
HAY RACK.
APPLICATION FILED DEC. 30, 1913.
1,125,523.
Patented Jan. 19, 1915.
4 SHEETS—SHEET 3.
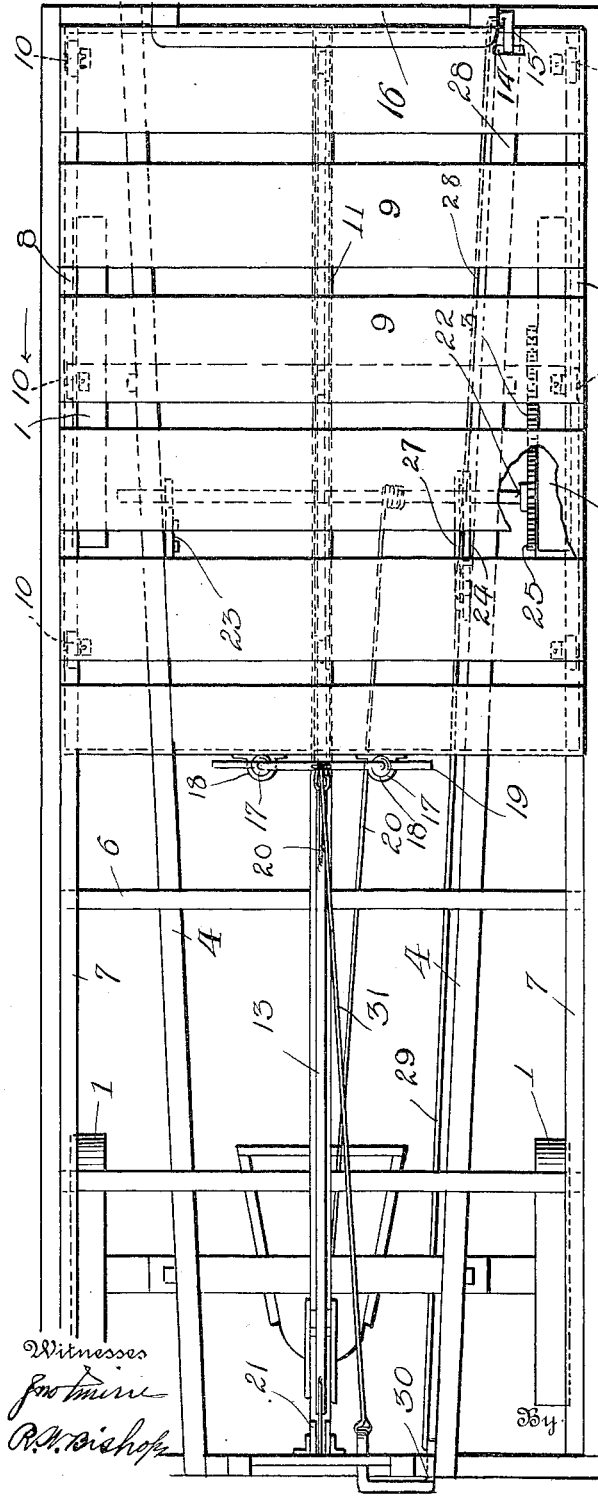
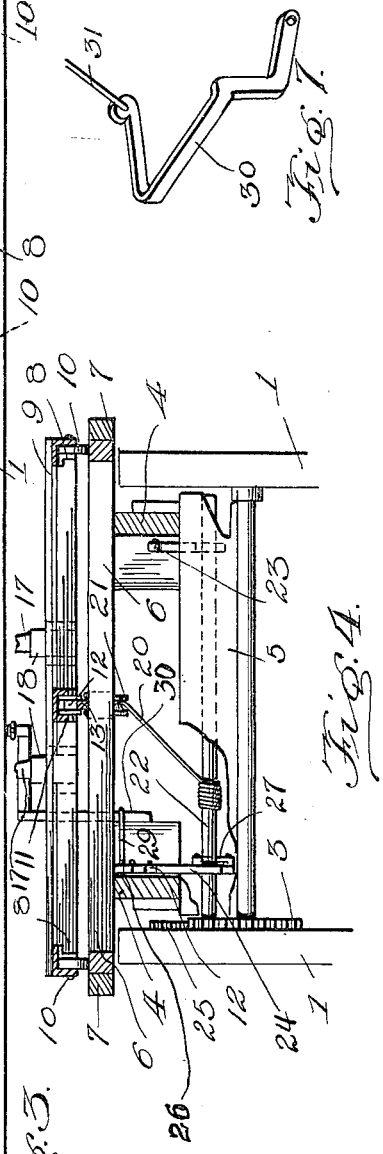
Inventor
W. C. Harrold

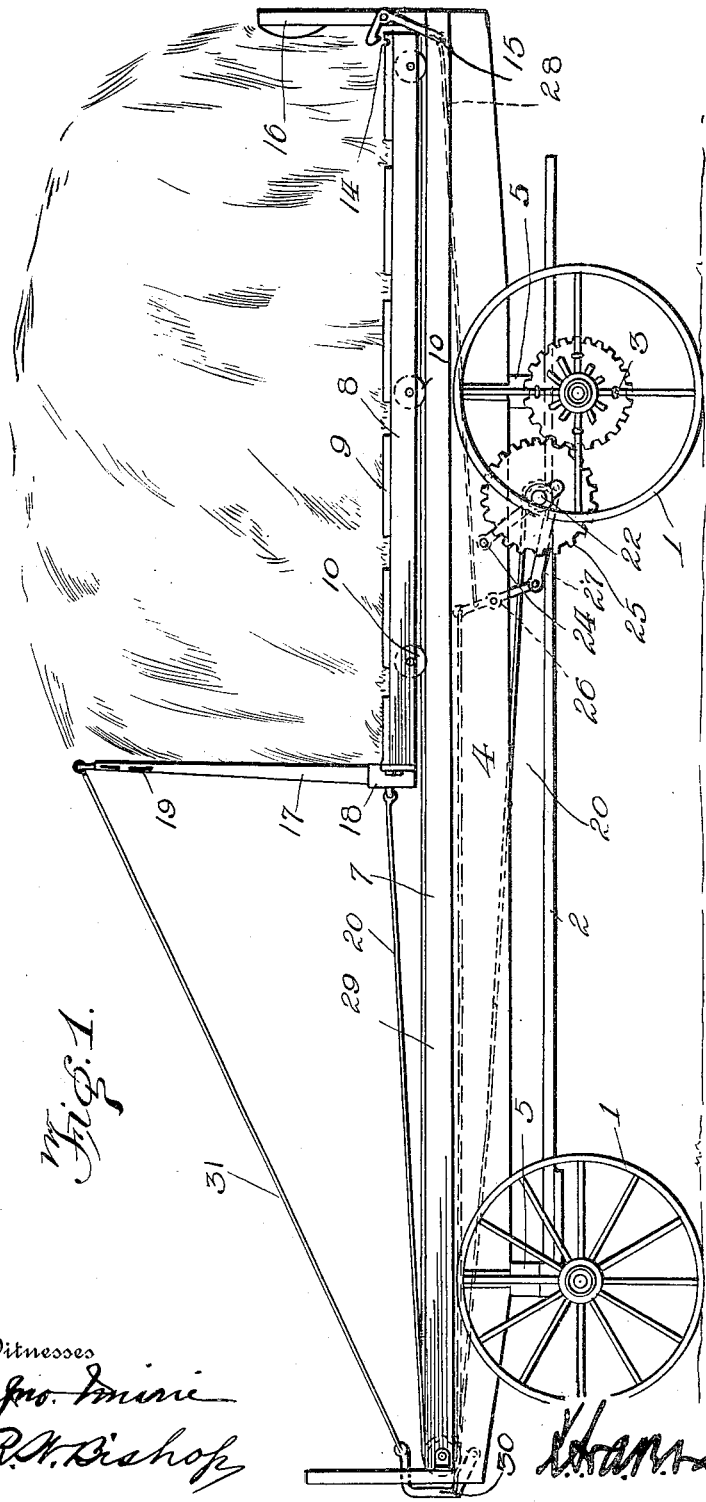

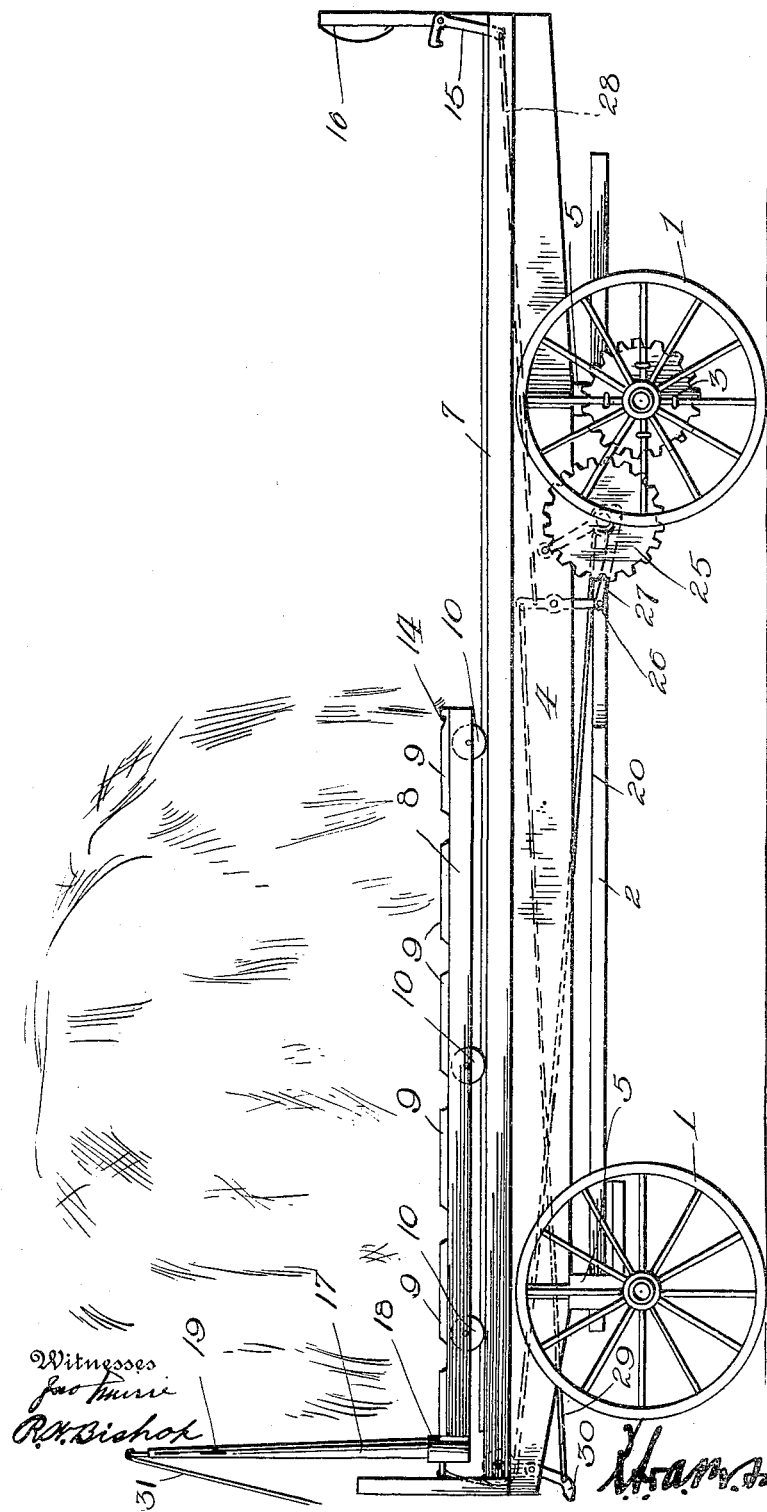

W. C. HARROLD.
HAY RACK.
APPLICATION FILED DEC. 30, 1913.

1,125,523.

Patented Jan. 19, 1915.
4 SHEETS—SHEET 4.

Witnesses

Inventor
W. C. Harrold
By
Attorneys

UNITED STATES PATENT OFFICE.

WALTER C. HARROLD, OF MOUNT EATON, OHIO.

HAY-RACK.

1,125,523.  Specification of Letters Patent.  Patented Jan. 19, 1915.

Application filed December 30, 1913. Serial No. 809,513.

*To all whom it may concern:*

Be it known that I, WALTER C. HARROLD, citizen of the United States, residing at Mount Eaton, in the county of Wayne and State of Ohio, have invented certain new and useful Improvements in Hay-Racks, of which the following is a specification.

This invention relates to that class of hay racks in which a carrier is mounted upon a running gear or truck so as to travel longitudinally thereon, whereby the loading of the rack to the full capacity of the carrier and the truck may be accomplished uninterruptedly from a mechanical loader or by other means. In this class of devices, the carrier is stationed at the rear end of the truck and hay is deposited thereon, gearing being provided whereby the subsequent travel of the truck will transmit motion from the wheels of the same to the carrier so that the carrier will move forward upon the truck and the loading may continue uninterruptedly so that after the carrier has been fully loaded the portion of the truck at the rear thereof, formerly occupied by the carrier, may then be loaded.

The object of my present invention is to provide improved operating mechanism, whereby the gearing will be rendered inoperative automatically when the carrier reaches the front end of the truck, and a further object is to provide means whereby the carrier will be held against movement upon the truck, when stationed at the rear end thereof, until travel is imparted to the truck, and the carrier will then be automatically released.

A further object of the invention is to improve generally the construction and arrangement of the several parts of an apparatus for the stated purpose, to the end that the efficiency and durability of the same may be increased without any increase in the cost of production or maintenance.

The invention is illustrated in the accompanying drawings and consists in certain novel features which will be first fully described and then more particularly pointed out in the claims following the description.

Figure 5:
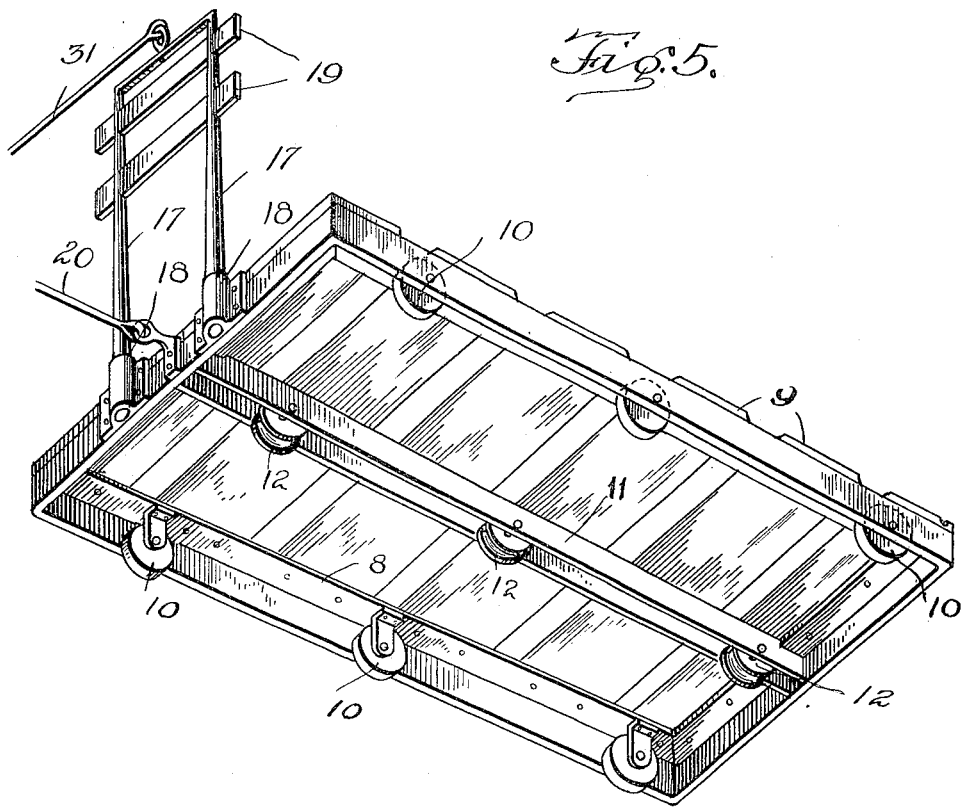
Figure 6:
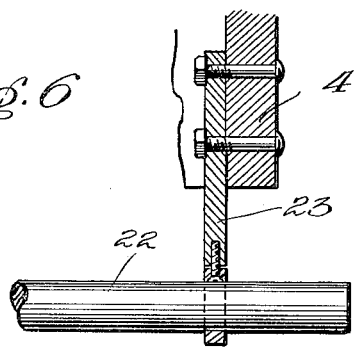

In the accompanying drawings: Figure 1 is an elevation of a truck having my improved hay rack mounted thereon and showing the carrier at the rear end of the truck. Fig. 2 is a similar view showing the carrier at the front end of the truck. Fig. 3 is a plan view of the apparatus. Fig. 4 is a transverse vertical section. Fig. 5 is a perspective view of the carrier looking at the under side thereof. Fig. 6 is a detail section of one of the hangers for the winding shaft or drum. Fig. 7 is a detail view showing the trip lever.

Corresponding and like parts are referred to in the following description and indicated in all the views of the accompanying drawings by the same reference characters.

The truck upon which the hay rack is mounted may be the running gear of any ordinary farm wagon, comprising the carrying wheels 1 and a reach or other connection between the same indicated at 2. One of the rear carrying wheels 1 has a master gear wheel 3 rigidly secured thereto, as shown. The hay rack comprises sills 4 which are placed upon the bolsters 5 of the running gear and are secured thereto in any convenient or preferred manner. Upon the said sills 4 are rigidly secured cross beams or bars 6 to the outer ends of which are secured rails 7. The carrier consists of side bars 8 and boards or other supports constituting a floor 9 secured at their ends to the said side bars and extending between the same to support the load of hay. Upon the side bars 8 are journaled rollers or wheels 10 which are adapted to run upon the rails 7 and the length of the carrier is preferably about one half the length of the said rails. To the under side of the floor or boards 9 at the centers thereof, I secure a longitudinal channel bar 11 in which are mounted a plurality of grooved rollers 12 which are adapted to run upon a flanged rail 13 secured to the cross bars 6 and extending longitudinally of the apparatus at the center of the same. The grooved rollers or wheels engaging the said rail 13 will guide the carrier in its movement and prevent lateral deflection of the same so that it will be maintained in its proper position upon the truck at all times. At the rear end of the carrier is provided a keeper or socket 14 which is adapted to be engaged by a latch 15 pivoted upon the end gate 16 erected at the rear end of the apparatus, as shown clearly in Figs. 1 and 2. This latch is preferably in the form of an angle lever having its upper arm extending forwardly of the carrier and adapted to engage the said socket or keeper so that forward movement of the carrier will be normally resisted, and the lower arm of said latch extends downward between the rails 7. At the front end of the carrier is provided a gate or support for the load consisting of standards 17 secured in sockets 18 upon the carrier in any convenient manner and connected at their upper ends by bars or rails 19, as shown clearly in Fig. 5.

To the front end of the carrier I attach one end of a cable 20 which extends forwardly to and around a guide roller 21 at the front end of the frame and thence extends rearwardly to a winding shaft or drum 22, which is mounted in supports secured upon the sills 4. One end of this winding shaft or drum 22 is carried in a fixed bracket 23 which is secured to the adjacent sill 4 and the opposite end of the said winding shaft or drum is mounted in a hanger 24 which is pivotally attached to the adjacent sill 4. The winding shaft or drum extends laterally beyond the said hanger 24 and is equipped with a spur wheel 25 at its end adapted to mesh with the master gear wheel 3, as shown in Fig. 1, and as will be readily understood. When the hanger 24 is in the position shown in Fig. 1, the winding shaft will be swung rearwardly in the bracket 23 sufficiently to cause the spur wheel 25 to mesh with the gear wheel 3, whereupon as the truck is drawn forwardly, the winding shaft will be rotated and the cable 20 wound thereon. The carrier will then be caused to travel upon the truck toward the front end thereof, as will be readily understood.

A lever 26 is fulcrumed upon the sill 4 somewhat in advance of the hanger 24 and the lower end of the said lever is connected with the lower end of said hanger by a connecting rod or link 27. The upper portion of the lever is connected by a rod 28 with the lower end of the latch 15 and by a rod 29 with a trip lever 30 mounted upon the frame at the front end thereof. This trip lever 30 is of an ogee form so that it may extend forwardly from its fulcrum beyond the front end of the frame and then upwardly in advance of the front end of the frame and then overhang the said frame, the upper extremity of the lever having attached thereto a rope or cable 31 which is attached to the upper end of the gate at the front end of the carrier so that it will be always in position for use.

It is thought the operation and advantages of my improved hay rack will be readily understood from the foregoing description taken in connection with the accompanying drawings. The truck is so positioned that the hay will be deposited upon the carrier until the same is loaded to its capacity. The parts being disposed in the position shown in Fig. 1, if the team be driven forward after the carrier is loaded, the carrier will be caused to move toward the front end of the truck through the action of the master wheel 3, the spur wheel 25, the cable 20 and the parts coöperating therewith, as will be readily understood, and the hay may be loaded on the truck in rear of the carrier. When the carrier reaches the front end of the truck, the front end of the carrier will strike the upper end of the trip lever 30 and will throw the same to the position illustrated in Fig. 2, so that the lever 26 will swing about its fulcrum and withdraw the spur wheel 25 from its engagement with the master gear wheel 3, whereupon the travel of the carrier will cease. After the hay has been unloaded from the rack into the barn or other place of storage, the carrier is returned to the rear end of the truck so that the operation described may be repeated and the rack again loaded. It will be readily noted that when the trip lever 30 is swung to the position shown in Fig. 2, the latch 15 will be permitted to drop into position to engage the keeper at the rear end of the carrier so that when the carrier is returned to the rear end of the truck, it will be held against movement upon the truck until it has been again loaded. After the carrier has been loaded to its capacity a pull is exerted upon the cable 31 sufficient to return the trip lever 30 to the position shown in Fig. 1, thereby throwing the spur wheel 25 in mesh with the gear wheel 3 and drawing upon the lower end of the latch 15 so as to release the same from the rear end of the carrier. The cable 31 is shown in the drawings attached to the upper portion of the gate at the front end of the carrier, but it will be understood that this arrangement is merely one of convenience, and that the said cable may be otherwise disposed.

My apparatus is composed of very few parts and these parts are all of very simple construction, so that it is not apt to get out of order and repairs will not be frequently needed. Moreover, the apparatus will operate easily and places no excessive strain upon the draft animals.

Having thus described the invention, what is claimed as new is:

1. An apparatus for the purpose set forth comprising a wheeled truck, a carrier mounted to travel thereon, means at the rear end of the truck for normally holding the carrier at rest, means on the truck for actuating the carrier, and means for moving said actuating means to an inoperative position and simultaneously moving to operative position the means for holding the carrier at rest.

2. In an apparatus for the purpose set forth, the combination of a wheeled truck, a carrier mounted to travel thereon, a winding shaft having one end loosely mounted upon the truck, a cable secured to the said shaft and to the front end of the carrier, a master gear on the truck, a gear on one end of said shaft adapted to mesh with the master gear, a vibratory hanger pivoted at its upper end on the truck and carrying that end of the winding shaft which is equipped with a gear, a lever fulcrumed between its ends on the side of the truck in advance of said hanger, a link connecting the lower end of said lever with the lower end of the hanger, a trip lever fulcrumed at its lower end upon the front end of the truck and having its upper edge projecting over the truck into the path of the carrier, and a connecting rod pivoted at its rear end to the upper end of the first-mentioned lever and at its front end to the trip lever above the lower end thereof.

3. In an apparatus for the purpose set forth, the combination of a wheeled truck, a carrier mounted to travel thereon, a latch mounted at the rear end of the truck and adapted to engage the rear end of the carrier, means for actuating the carrier comprising a shaft mounted upon the truck, a lever mounted upon the truck and connected with said shaft to move the same to operative and inoperative positions, a trip lever mounted at the front end of the truck in the path of the carrier, a connection between said trip lever and the first mentioned lever, a connection between the first mentioned lever and the latch.

In testimony whereof I affix my signature in presence of two witnesses.

WALTER C. HARROLD. [L. S.]

Witnesses:
O. C. WEIMER,
E. CLEOPHAS.

Copies of this patent may be obtained for five cents each, by addressing the "Commissioner of Patents, Washington, D. C."